(12) United States Patent
Bechtel et al.

(10) Patent No.: US 7,631,898 B2
(45) Date of Patent: Dec. 15, 2009

(54) POWER RELEASE AND LOCKING ADJUSTABLE STEERING COLUMN APPARATUS AND METHOD

(75) Inventors: Travis D Bechtel, Goodrich, MI (US); William J Elliot, Commerce, MI (US); William A Jolley, West Bloomfield, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 603 days.

(21) Appl. No.: 11/339,047

(22) Filed: Jan. 25, 2006

(65) Prior Publication Data

US 2007/0170711 A1 Jul. 26, 2007

(51) Int. Cl.
*B62D 1/18* (2006.01)
(52) U.S. Cl. .................................................. 280/775
(58) Field of Classification Search ................. 280/775; 74/493; 464/140, 162
See application file for complete search history.

(56) References Cited

U.S. PATENT DOCUMENTS

| 4,752,085 | A  | * | 6/1988  | Yamamoto ............... 280/775 |
| 6,237,438 | B1 | * | 5/2001  | Ben Rhouma et al. ....... 74/492 |
| 6,764,098 | B2 | * | 7/2004  | Matsumoto et al. ........ 280/777 |
| 7,275,458 | B2 | * | 10/2007 | Kinme et al. ............... 74/493 |
| 7,367,246 | B2 | * | 5/2008  | Ben Rhouma et al. ....... 74/493 |
| 2006/0230863 | A1 | * | 10/2006 | Rouleau et al. ............ 74/492 |

* cited by examiner

*Primary Examiner*—Faye M. Fleming
(74) *Attorney, Agent, or Firm*—Ralph E. Smith

(57) ABSTRACT

A steering column is provided column including a bracket adapted to enable the steering column to move as desired by an operator and a clamping system adjacent to the bracket. The clamping system includes a threaded member. A threaded clamping stud extends through the bracket. The threaded clamping stud is selectively coupled to the threaded member of the clamping device. A transmission is coupled to the threaded member. A motor is coupled to the transmission. The motor is operable to drive the transmission to rotate the threaded member in a first position to unclamp the bracket to enable the steering column to move based on receipt of an input from the operator.

19 Claims, 5 Drawing Sheets

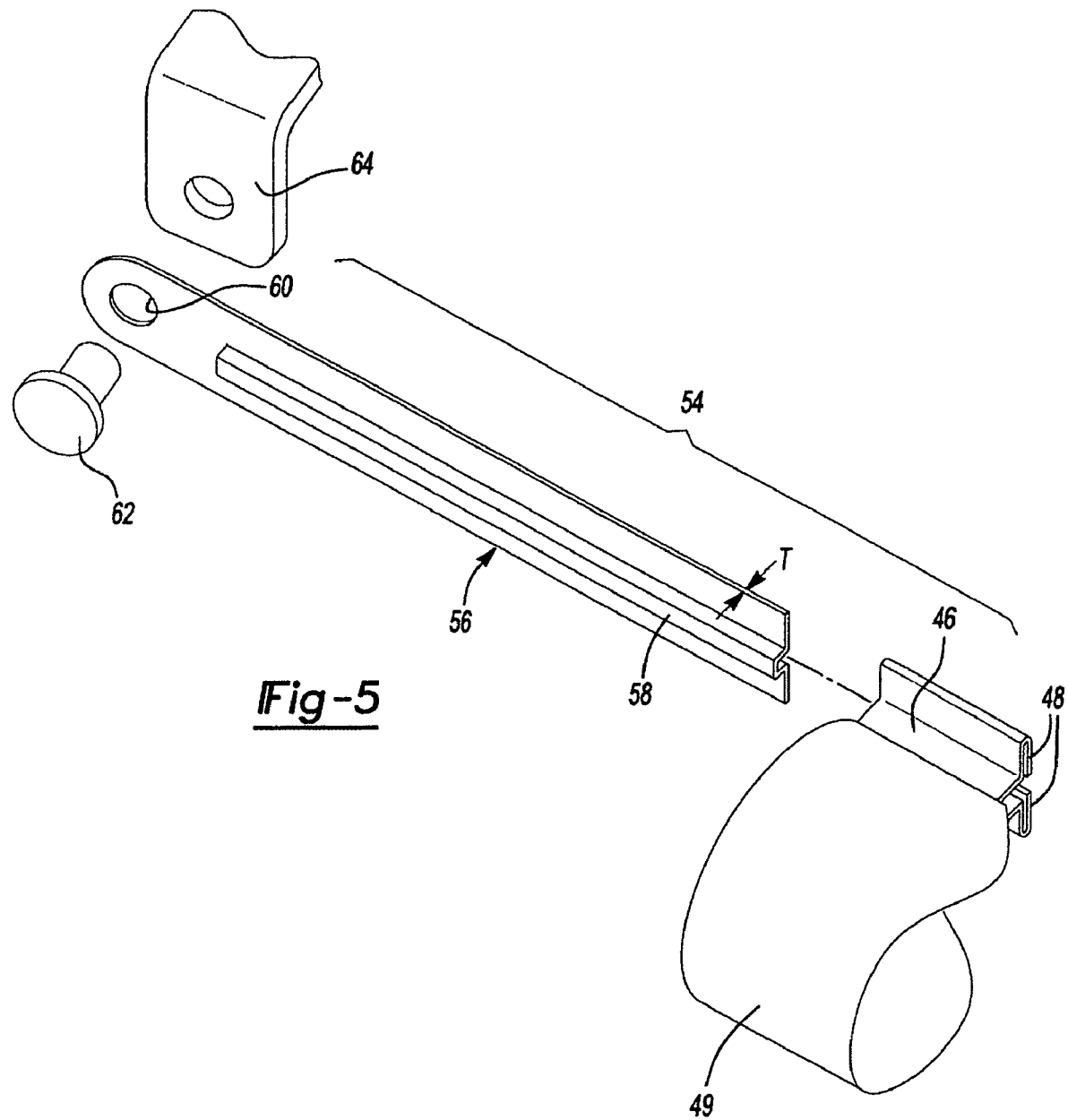

POWER RELEASE AND LOCKING ADJUSTABLE STEERING COLUMN APPARATUS AND METHOD

FIELD

The present invention relates generally to steering systems, and more particularly to a power release and locking adjustable steering column.

BACKGROUND

Vehicle steering columns are often provided with a tiltable component that enables the steering wheel to be set at varying degrees of tilt according to the desires and needs of different operators. Typically, a manually operable lock mechanism is provided for retaining the steering wheel component in selected positions of tilt adjustment.

Most manually operable lock mechanisms require the operator to pull a lever or other device in order to unlock the steering column. This lever must then be repositioned to relock the steering column after the steering column is pivoted. This is undesirable for some users who would prefer an automatic locking and unlocking steering column.

SUMMARY

The present invention provides a steering column including a bracket adapted to enable the steering column to move as desired by an operator and a clamping system adjacent to the bracket. The clamping system includes a threaded member and a reaction cam. The reaction cam is responsive to an input from the threaded member to selectively engage a surface of the bracket. A threaded clamping stud extends through the bracket. The threaded clamping stud is selectively coupled to the threaded member of the clamping device to prevent the movement of the steering column. A transmission is coupled to the threaded member. A motor is coupled to the transmission. The motor is operable to drive the transmission to rotate the threaded member into a first position to unclamp the bracket to enable the steering column to move based on receipt of an input from the operator.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a detail exploded view of the motor rail system of FIG. 3 according to an exemplary embodiment of the present invention.

DETAILED DESCRIPTION OF VARIOUS EMBODIMENTS

The following description of the various embodiments is merely exemplary in nature and is in no way intended to limit the invention, its application, or uses.

The present invention is generally related to a power release and locking adjustable steering column. Although the following exemplary description refers to a tilt steering column, it will be understood that the present invention is applicable to a tilt and telescoping steering column or other steering columns in general. It will also be understood that the motor vehicle referenced below is an exemplary vehicle, and the foregoing methodology, as applied to this motor vehicle, is applied to any variety of motor vehicles. Further, the foregoing description is understood to not limit the appended claims.

Figure 1:
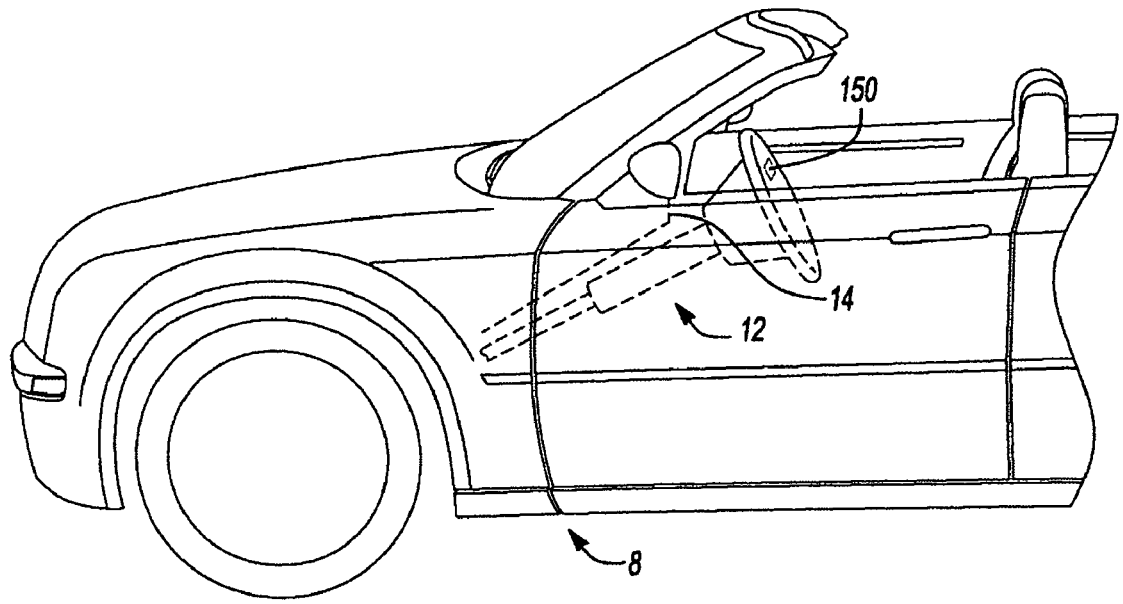
FIG. 1 is a perspective view of an exemplary motor vehicle employing a power release and locking adjustable steering column according to an exemplary embodiment of the present invention.
Figure 2:
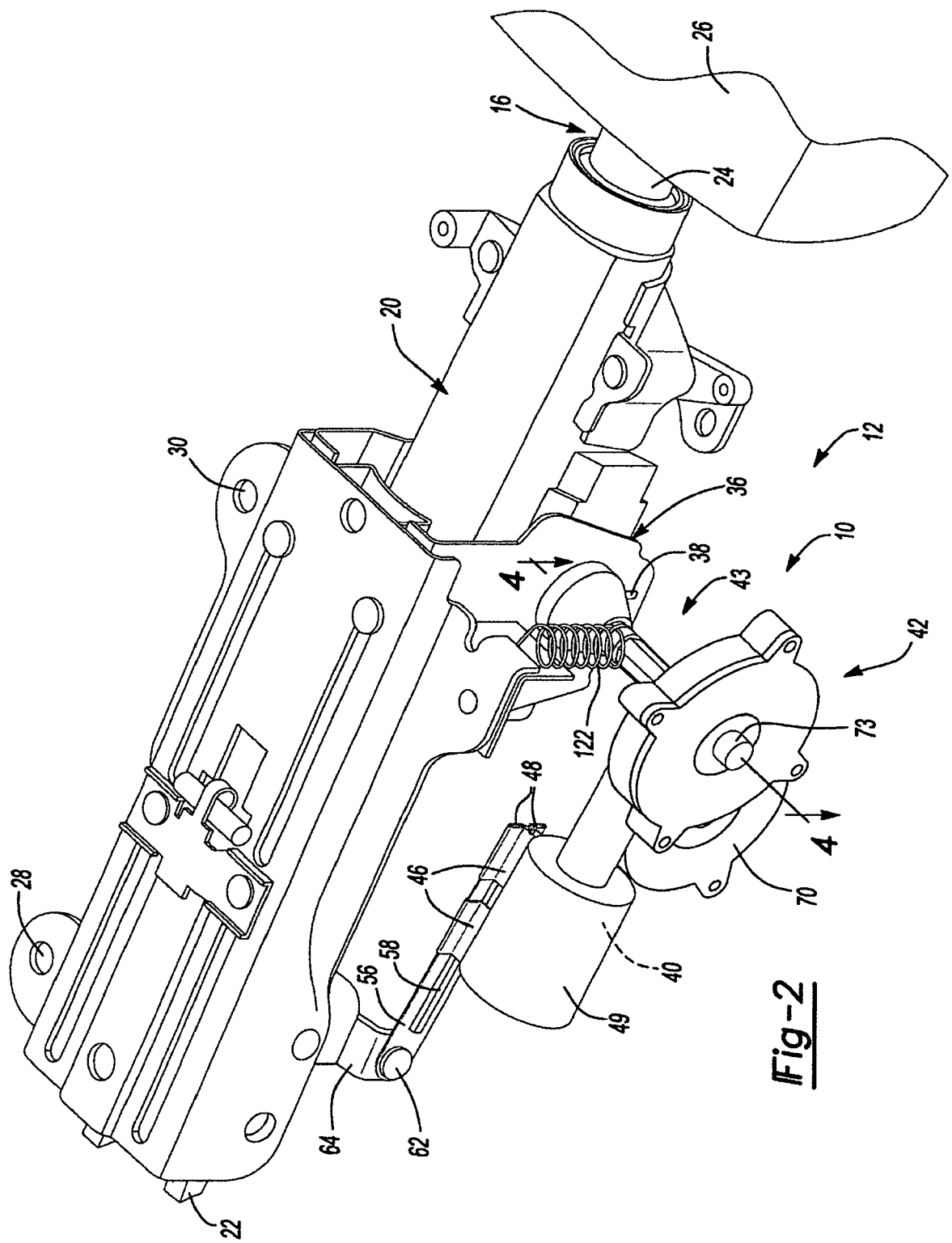
FIG. 2 is a perspective view of the power release and locking adjustable steering column of FIG. 1 according to an exemplary embodiment of the present invention.

Referring to FIGS. 1 and 2, the present invention is directed to a power release and locking system 10 for a steering column 12 for a motor vehicle 8. The steering column 12 is supported by a fixed surface of a vehicle compartment 14, such as an instrument panel (not specifically shown). The locking system 10 allows the steering column 12 to move with respect to the vehicle compartment 14.

Generally, the steering column 12 includes a shaft 16 and a jacket 20. The shaft 16 extends through the jacket 20, and has a first end 22 and a second end 24. The shaft 16 generally is configured to collapse in the event of a crash event. The first end 22 is coupled to a steering system (not specifically shown) of the vehicle 8. The second end 24 of the shaft 16 is configured to receive a steering wheel 26. The shaft 16 is rotatably coupled to the jacket 20 to enable a rotary input from an operator (not shown) to be transmitted to the steering system of the vehicle 8.

The jacket 20 of the steering column 12 includes a first mounting point, such as a guide bracket 28, and a second mounting point 30. Generally, the guide bracket 28 couples the jacket 20 of the steering column 12 to a lower mounting point in the vehicle compartment 14 (not specifically shown). The second mounting point 30 couples the jacket 20 of the steering column 12 to an upper mounting point in the vehicle compartment 14 (not specifically shown). The second mounting point 30 is coupled to a translating bracket or bracket 36.

The bracket 36 is integrally formed with the guide bracket 28, or is coupled to the second mounting point 30 of the jacket 20 through any appropriate technique, such as through mechanical fasteners or welding. The bracket 36 is formed of a metal or metal alloy, such as magnesium, steel or other suitable materials. The bracket 36 generally defines two apertures or slots 38. The slots 38 is defined in the bracket 36 via any suitable technique, such as casting, forming or machining. The slots 38 enables the steering column jacket 20 to move, pivot or tilt with respect to the vehicle compartment 14, as will be described in greater detail herein. The slots 38 is also configured for receipt of a portion of the locking system 10 therein.

Figure 3:
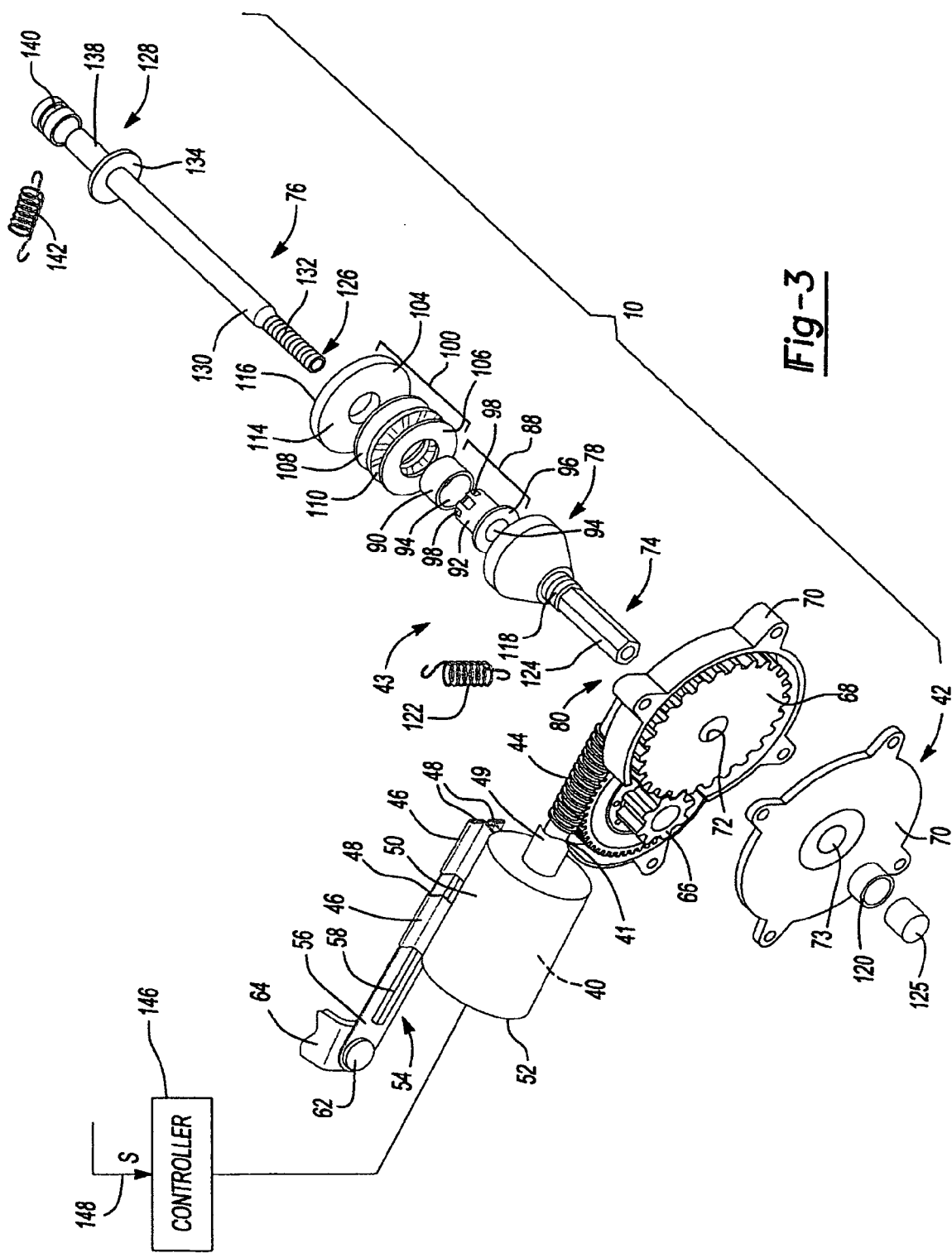
FIG. 3 is an exploded view of the power release and locking system employed in the steering column of FIG. 1 according to an exemplary embodiment of the present invention.

With reference to FIGS. 2 and 3, the locking system 10 includes a motor 40 coupled to a transmission 42. The transmission 42 is coupled to a clamping system 43. The motor 40 is any suitable motor, but generally is a DC motor. The motor 40 includes a driveshaft 41, which defines a worm 44. The worm 44 is rotatably coupled with the transmission 42. The motor 40 further includes at least one or a plurality of U-shaped flanges 46 with bent edges 48. The plurality of U-shaped flanges 46 generally is formed on a motor housing 49. The U-shaped flanges 46 is generally coupled at a first end 50 and a second end 52 of the motor 40 to enable the motor 40 to slidably engage a rail assembly 54.

With additional reference to FIG. 5, the rail assembly 54 includes a rail 56 having a protrusion 58 extending the length of the rail 56 to engage the U-shaped flanges 46 of the motor 40. Generally, the rail 56 has a thickness T, which enables the rail 56 to be slidably coupled to the motor 40 via the bent edges 48. The rail 56 also defines an aperture 60 for receipt of a pin 62 therein. The pin 62 couples the rail 56 to a supporting bracket 64 formed on the jacket 20 of the steering column 12. Typically, the rail assembly 54 is designed so that the rail assembly 54 reacts to the torque of the motor 40 to prevent the unlocking of the locking system 10 in the event of a collapse of the steering column 12. In addition, the rail assembly 54 enables the motor 40 to collapse with the steering column 12, as will be described in greater detail herein.

With reference now to FIGS. 2 and 3, the transmission 42 is coupled to the motor 40 via the worm 44. Generally, the transmission 42 includes a worm gear 66 rotatably coupled to the worm 44 and a spur gear 68 rotatably coupled to the worm gear 66. At least a portion of the worm 44, worm gear 66 and spur gear 68 is enclosed by a transmission housing 70. The transmission housing 70 is integrally formed with the motor housing 49, if desired. The spur gear 68 includes an aperture 72 for receipt of the clamping system 43 therein. The transmission housing 70 also generally includes a throughbore 73 to enable the aperture 72 to engage the clamping system 43.

Figure 4:
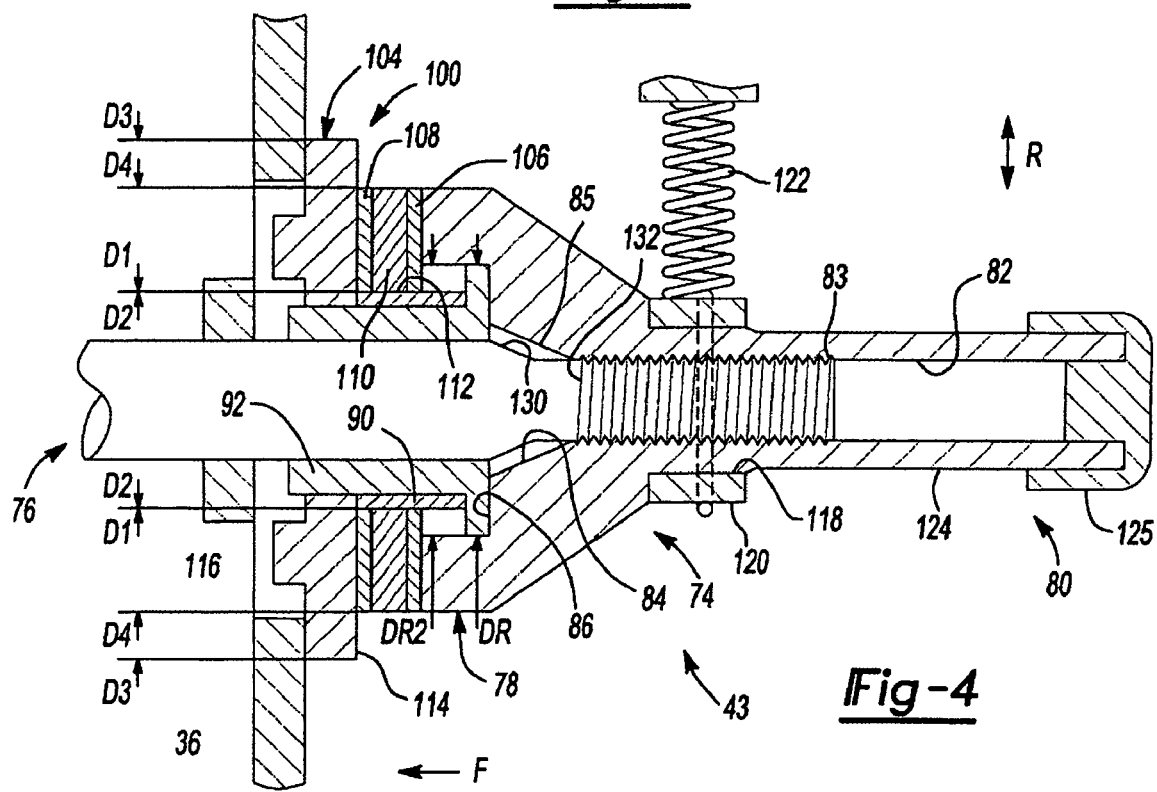
FIG. 4 is a cross sectional view of the power release and locking system, taken along line 4-4 in FIG. 2 according to an exemplary embodiment of the present invention.

With continuing reference to FIGS. 2 and 3, and additional reference to FIG. 4, the clamping system 43 includes a threaded member 74 configured to be coupled to a tilt clamp stud 76. The threaded member 74 includes a first end 78, a second end 80 and a throughbore 82 defining a plurality of threads 83. The first end 78 is generally conical in shape and define an inner cavity 84 with an apex 85. The inner cavity 84 includes a radial groove 86 for receipt of a guide bushing assembly 88.

The guide bushing assembly 88 includes an annular bearing surface 90 coupled to a bearing retainer 92. The guide bushing assembly 88 defines a throughbore 94 for receipt of the tilt clamp stud 76 therein. In effect, the guide bushing assembly 88 aligns the tilt clamp stud 76 with the threaded member 74, as will be discussed in greater detail herein. The annular bearing surface 90 is composed of a polymeric material, but metals or metal alloys may be employed. The bearing retainer 92 also includes an annular flange 96. The annular flange 96 is configured to mate with the radial groove 86 defined in the inner cavity 84. Generally, a diameter DR of the radial groove 86 is slightly larger than a diameter DR2 of the annular flange 96 to enable the bearing retainer 92 to be press-fit into the inner cavity 84 of the threaded member 74 (FIG. 4). The bearing retainer 92 includes at least one or a plurality of retaining teeth 98 for coupling a thrust bearing assembly 100 to the bearing retainer 92, and thus, the threaded member 74 (FIG. 3).

The thrust bearing assembly 100 includes a caged race assembly or a thrust bearing assembly 102 and a reaction cam 104. The thrust bearing assembly 102 includes an inner cage or ring 106 and an outer cage or ring 108 surrounding a race assembly 110. Each of the inner ring 106, outer ring 108 and race assembly 110 defines a throughbore 112. The throughbore 112 generally has a diameter D1, which is greater than a diameter D2 of the annular bearing surface 90 so that the thrust bearing assembly 102 is received onto the bearing retainer 92.

The race assembly 110 comprises a needle bearing or a roller bearing assembly, depending upon the torque created by the motor 40. The inner ring 106 generally is disposed adjacent to the first end 78 of the threaded member 74, while the outer ring 108 is disposed against the reaction cam 104. The reaction cam 104 is comprised of a metal or metal alloy, and generally is sized with a diameter D3, which is greater than a diameter D4 of the thrust bearing assembly 102. The reaction cam 104 includes a first side 114 and a second side 116. The first side 114 is positioned adjacent to the outer ring 108 of the thrust bearing assembly 102 and the second side 116 generally is disposed adjacent to the bracket 36. The second side 116 typically applies a locking force F to the bracket 36 to prevent the steering column 12 from pivoting, as will be discussed in greater detail herein.

The second end 80 of the threaded member 74 generally is cylindrical in shape. The second end 80 defines a raised annular flange 118. The raised annular flange 118 is configured for receipt of a journal 120 to support a tilt assist spring 122. The journal 120 enables the threaded member 74 to rotate without disturbing the tilt assist spring 122. The tilt assist spring 122 provides a resistive force R against the movement of the steering column 12, and also serves to return the steering column 12 to a full-tilt up position (not specifically shown). The second end 80 also defines a hexagonal portion 124 adjacent to the raised annular flange 118 to enable the aperture 72 of spur gear 68 of the transmission 42 to engage the threaded member 74. A dust cap 125 is received on the second end 80, adjacent to the transmission housing 70, to prevent contaminants from entering the assembly, and to assist in retaining the transmission 42 on the second end 80.

With reference to FIGS. 3 and 4, the tilt clamp stud 76 of the clamping system 43 is generally cylindrical and includes a first end 126 and a second end 128. The first end 126 includes a necked portion 130 including a plurality of threads 132. The necked portion 130 is positioned on the first end 126 so that the necked portion 130 is received adjacent to the apex 85 of the threaded member 74. The plurality of threads 132 matingly engages the plurality of threads 83 formed in the throughbore 82 of the threaded member 74 to enable the clamping system 43 to clamp or unclamp the bracket 36. The second end 128 of the tilt clamp stud 76 includes a formed projection 134. The formed projection 134 is sized so that the formed projection 134 engages an exterior surface 136 of the bracket 36, but the formed projection 134 cannot pass through the slot 38. The second end 128 also includes a stem 138. A journal 140 is received on the stem 138 to support a second tilt assist spring 142. The second tilt assist spring 142 is coupled to an aperture (not specifically shown) formed on the jacket 20 to facilitate the movement of the steering column 12 based on the input from the operator (not specifically shown), as will be discussed in greater detail herein.

The locking system 10 also includes a controller 146 (FIG. 3). The controller 146 is coupled to the motor 40 to energize the motor 40 based on an input 148 from an operator (not shown). The input 148 is in the form of a signal S transmitted from a pushbutton 150 (FIG. 1), for example, but other input devices may be employed. In order to move or pivot the steering column 12, on receipt of the signal S, and as the signal S continues, the controller 146 energizes the motor 40. The motor 40, in turn, drives the driveshaft 41 to drive the worm 44, which drives the worm gear 66 and the spur gear 68.

The rotation of the spur gear 68, in turn, rotates the threaded member 74 in a first direction to move the reaction cam 104 away from the bracket 36 to release the locking force F from the bracket 36. Then, the operator moves the steering column 12 via the steering wheel 26 into a desired position.

Once the steering column 12 is in the desired position, the operator releases the pushbutton 150. Once the pushbutton 150 is released, the signal S terminates, and the controller 146 energizes the motor 40 to drive the transmission 42 and rotate the threaded member 74 in a second direction to tighten the reaction cam 104 against the bracket 36. Once the reaction cam 104 is tightened against the bracket 36, the steering column 12 is locked into the new position set by the operator.

Figure 6:
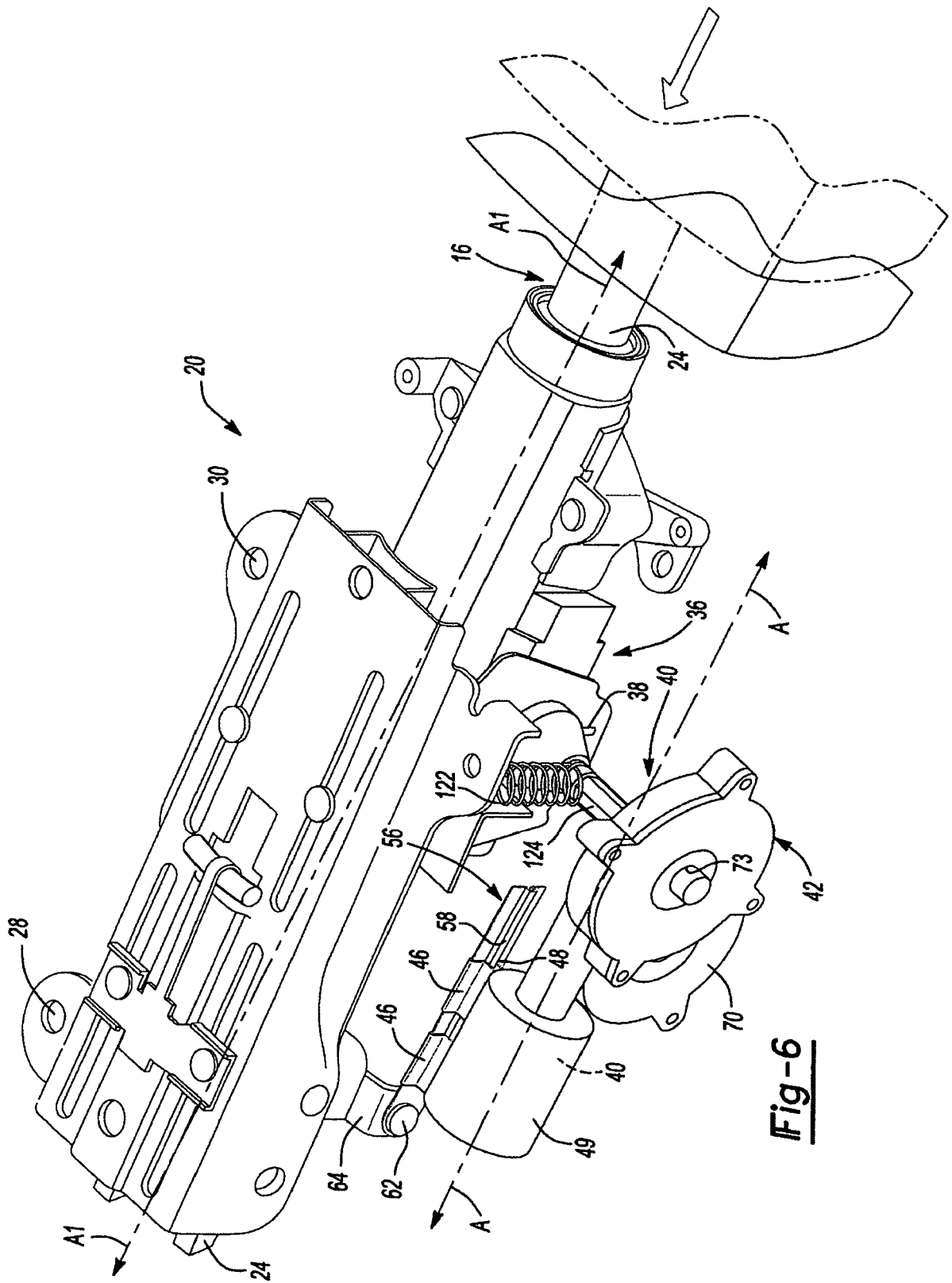
FIG. 6 is a perspective view of the power release and locking adjustable steering column of FIG. 1 in a collapsed position according to an exemplary embodiment of the present invention.

With reference now to FIG. 6, in the event of a collapse of the steering column 12 during a crash event, the shaft 16 of the steering column 12 collapses and the jacket 20 is sheared from the second mounting point 30 of the vehicle compartment 14 (not shown). During the collapse of the steering column 12, the motor 40 slides down the rail 56 with the steering column 12 so that the clamping system 43 stays locked during a crash event. Generally, an axis A of the motor 40 in a collapsed state will be parallel to an axis A1 of the shaft 16 of the steering column 12 in the collapsed state to protect the occupant.

The description of these teachings is merely exemplary in nature and, thus, variations that do not depart from the gist of the teachings are intended to be within the scope of the teachings. Such variations are not to be regarded as a departure from the spirit and scope of the teachings.

What is claimed is:

1. A steering column comprising:
   a bracket adapted to enable the steering column to move as desired by an operator;
   a clamping system adjacent to the bracket, the clamping system including a threaded member and a reaction cam, the reaction cam responsive to an input from the threaded member to selectively engage a surface of the bracket;
   a threaded clamping stud extending through the bracket, the threaded clamping stud selectively coupled to the threaded member of the clamping system to prevent movement of the steering column;
   a transmission coupled to the threaded member; and
   a motor coupled to the transmission, the motor operable to drive the transmission to rotate the threaded member into a first position to unclamp the bracket to enable the steering column to move based on receipt of an input from the operator.

2. The steering column of claim 1, wherein the clamping system further comprises:
   a guide bushing assembly coupled to the threaded member, with at least a portion of the guide bushing assembly disposed within the threaded member, the guide bushing assembly configured to slidably engage the threaded clamping stud and to guide the threaded clamping stud into the threaded member; and
   a thrust bearing assembly disposed about the guide bushing assembly, the thrust bearing assembly coupled to the threaded member by the guide bushing assembly, the thrust bearing assembly configured to absorb excess torque during the rotation of the threaded member.

3. The steering column of claim 2, wherein the threaded member further comprises:
   a first end defining a conical shape with a cavity for receipt of the at least a portion of the guide bushing assembly and an apex;
   a second end defining a cylindrical member extending from the apex the first end, the second end of the threaded member configured to be rotatably coupled to the transmission; and
   a plurality of threads are formed on a throughbore in the threaded member that extends from the apex of the first end to an end of the second member.

4. The steering column of claim 3, wherein the second end of the threaded member of the clamping device defines a portion for receipt of a journal.

5. The steering column of claim 4, further comprising:
   a tilt assist spring coupled to the journal on the second end of the threaded member of the clamping device to enable the steering column to move based on an input from the operator.

6. The steering column of claim 1, further comprising:
   a controller coupled to the steering column and responsive to an input signal from the operator to energize the motor to drive the transmission.

7. The steering column of claim 6, wherein receipt of the signal causes the controller to energize the motor to drive the transmission in a first direction to rotate the threaded member in the first direction to unclamp the threaded member from the bracket, and removal of the signal causes the controller to energize the motor to drive the transmission in a second direction to rotate the threaded member in a second direction to re-clamp the threaded member to the bracket.

8. The steering column of claim 7, further comprising:
   a rail assembly coupled to the steering column,
   wherein the motor is slidably coupled to the rail assembly, the rail assembly configured to guide the motor in the case of a crash event, the rail assembly configured to absorb the torque created during the operation of the motor.

9. The steering column of claim 3, wherein the transmission further includes a worm gear coupled to a worm formed on the driveshaft, and a spur gear coupled to the worm gear, the spur gear defining an aperture for receipt of the second end of the threaded member to rotate the threaded member.

10. A powered release and lock system for tilting a steering column in respect to a fixed surface of a vehicle compartment comprising:
    a rail assembly coupled to the steering column;
    a motor configured to slidably engage the rail assembly, the motor including a driveshaft;
    a transmission coupled to the driveshaft;
    a clamping system including a threaded member, the threaded member coupled to the transmission, the transmission operable to rotate the threaded member in a first or second position depending on an input from an operator;
    a bracket coupled to the steering column, the bracket operable to enable the steering column to move with respect to the fixed surface of the vehicle compartment when the bracket is not held by the clamping system; and
    a threaded tilt stud disposed through an aperture in the bracket, the threaded tilt stud selectively coupled to the threaded member of the clamping system to clamp the bracket.

11. The system of claim 10, wherein the clamping system further comprises:
    a guide bushing assembly coupled to the threaded member, with at least a portion of the guide bushing assembly disposed within the threaded member, the guide bushing assembly configured to slidably engage the threaded clamping stud and to guide the threaded clamping stud into the threaded member; and a thrust bearing assembly disposed about the guide bushing assembly, the thrust bearing assembly coupled to the threaded member by the guide bearing assembly, the thrust bearing assembly configured to absorb excess torque during the rotation of the threaded member.

12. The system of claim 11, wherein the threaded member further comprises:
a first end defining a conical shape with a cavity for receipt of the at least a portion of the guide bushing assembly and an apex;
a second end defining a cylindrical member extending from the apex the first end, the second end of the threaded member configured to be rotatably coupled to the transmission; and
a plurality of threads are formed on a throughbore in the threaded member that extends from the apex of the first end to an end of the second member.

13. The system of claim 12, further comprising:
a journal coupled to a feature formed on an exterior of the second end of the threaded member, and
a tilt assist spring coupled to the journal on the second end of the threaded member of the clamping device to enable the steering column to move based on an input from the operator.

14. The system of claim 10, further comprising:
a controller coupled to the steering column and responsive to an input signal from the operator to energize the motor to drive the transmission.

15. The system of claim 14, wherein the receipt of the signal causes the controller to energize the motor to drive the transmission in a first direction to rotate the threaded member in the first direction to unclamp the threaded member from the bracket, and removal of the signal causes the controller to energize the motor to drive the transmission in a second direction to rotate the threaded member in a second direction to re-clamp the threaded member to the bracket.

16. The system of claim 15, wherein the motor is slidably coupled to the rail assembly, the rail assembly configured to guide the motor in the case of a crash event, the rail assembly configured to absorb the torque created during the operation of the motor.

17. The system of claim 11, wherein the transmission further includes a worm gear coupled to a worm formed on the driveshaft and a spur gear coupled to the worm gear, the spur gear defining an aperture for receipt of the second end of the threaded member to rotate the threaded member.

18. A method for positioning a steering column comprising:
providing a motor, a transmission coupled to the motor, a bracket and a clamping device including a threaded member;
energizing the motor in response to a signal from an operator;
driving the transmission with the motor;
rotating the threaded member in a first direction with the transmission to unclamp the bracket;
manipulating the steering column into a desired position; and
rotating the threaded member in a second direction with the transmission to clamp the bracket once the signal from the operator ends.

19. The method of claim 18, further comprising:
providing a tilt spring coupled to the threaded member; and
biasing the steering column against the tilt spring to manipulate the steering column into a desired position.

* * * * *